United States Patent [19]
Levers

[11] Patent Number: 5,276,388
[45] Date of Patent: Jan. 4, 1994

[54] APPARATUS AND METHOD FOR CONTROLLING A WINDSHIELD WIPING SYSTEM

[75] Inventor: Juergen Levers, Bochum, Fed. Rep. of Germany

[73] Assignee: Leopold Kostal GmbH & Co. KG, Ludenscheid, Fed. Rep. of Germany

[21] Appl. No.: 988,766

[22] Filed: Dec. 10, 1992

Related U.S. Application Data

[63] Continuation-in-part of Ser. No. 989,052, Dec. 10, 1992.

[30] Foreign Application Priority Data

Dec. 14, 1991 [DE] Fed. Rep. of Germany ....... 4141348

[51] Int. Cl.$^5$ .............................................. B60S 1/08
[52] U.S. Cl. ............................ 318/444; 318/DIG. 2; 388/916; 388/907.5
[58] Field of Search ............... 318/443, 444, 480, 483, 318/264, DIG.; 323/299; 15/250.12, 250.13, 250.17; 388/907.5, 916, 921, 933

[56] References Cited

U.S. PATENT DOCUMENTS

| | | | |
|---|---|---|---|
| 3,947,131 | 3/1976 | Karl | 356/209 |
| 4,481,450 | 11/1984 | Watanabe, et al. | 318/444 |
| 4,588,935 | 5/1986 | Kaneiwa et al. | 318/483 |
| 4,595,866 | 6/1986 | Fukatsu et al. | 318/444 |
| 4,639,831 | 1/1987 | Iyoda | 361/286 |
| 4,798,956 | 1/1989 | Hochstein | 250/341 |
| 4,859,867 | 8/1989 | Larson et al. | 307/10.1 |
| 4,867,561 | 9/1989 | Fujii et al. | 318/483 X |
| 4,916,374 | 4/1990 | Schierbeek et al. | 318/483 |
| 5,015,931 | 5/1991 | Muller | 318/483 |
| 5,059,877 | 10/1991 | Teder | 318/444 |
| 5,140,234 | 8/1992 | Wallrafen | 318/264 |
| 5,157,312 | 10/1992 | Wallrafen | 318/264 |

FOREIGN PATENT DOCUMENTS

| | | |
|---|---|---|
| 431245A2 | 12/1991 | European Pat. Off. |
| 3314770C2 | 11/1987 | Fed. Rep. of Germany |
| 3722510A1 | 1/1989 | Fed. Rep. of Germany |
| 277437A1 | 4/1990 | Fed. Rep. of Germany |
| 3930732A1 | 3/1991 | Fed. Rep. of Germany |
| 0438633A1 | 7/1991 | Fed. Rep. of Germany |
| WO91/07298 | 5/1991 | PCT Int'l Appl. |
| WO91/09756 | 11/1991 | PCT Int'l Appl. |

*Primary Examiner*—Bentsu Ro
*Attorney, Agent, or Firm*—Brooks & Kushman

[57] ABSTRACT

An apparatus and method for controlling a windshield wiping system, based on a connection threshold defined for starting operation of the windshield wiping system, a disconnection threshold defined for ceasing operation of the windshield wiping system in an intermittent mode of operation, and a disconnection threshold defined for ceasing operation of the windshield wiping system in a continuous mode of operation. The apparatus includes a sensor apparatus and a circuit arrangement. The sensor apparatus which generates a signal the value of which varies based on the degree of liquid or dirt on the windshield. The sensor signal is then processed by a microprocessor. The thresholds are defined based on the sensor signal.

18 Claims, 3 Drawing Sheets

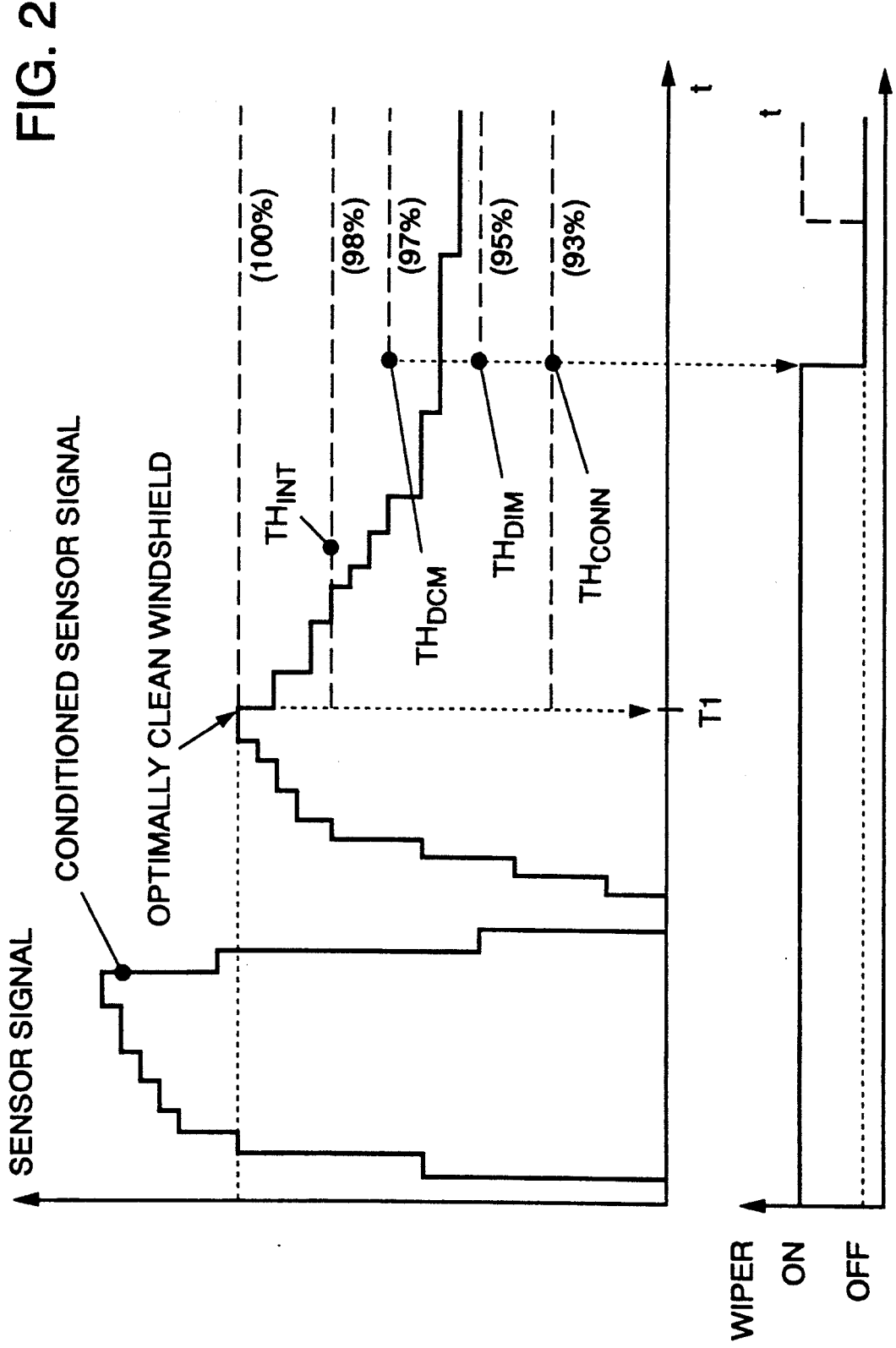

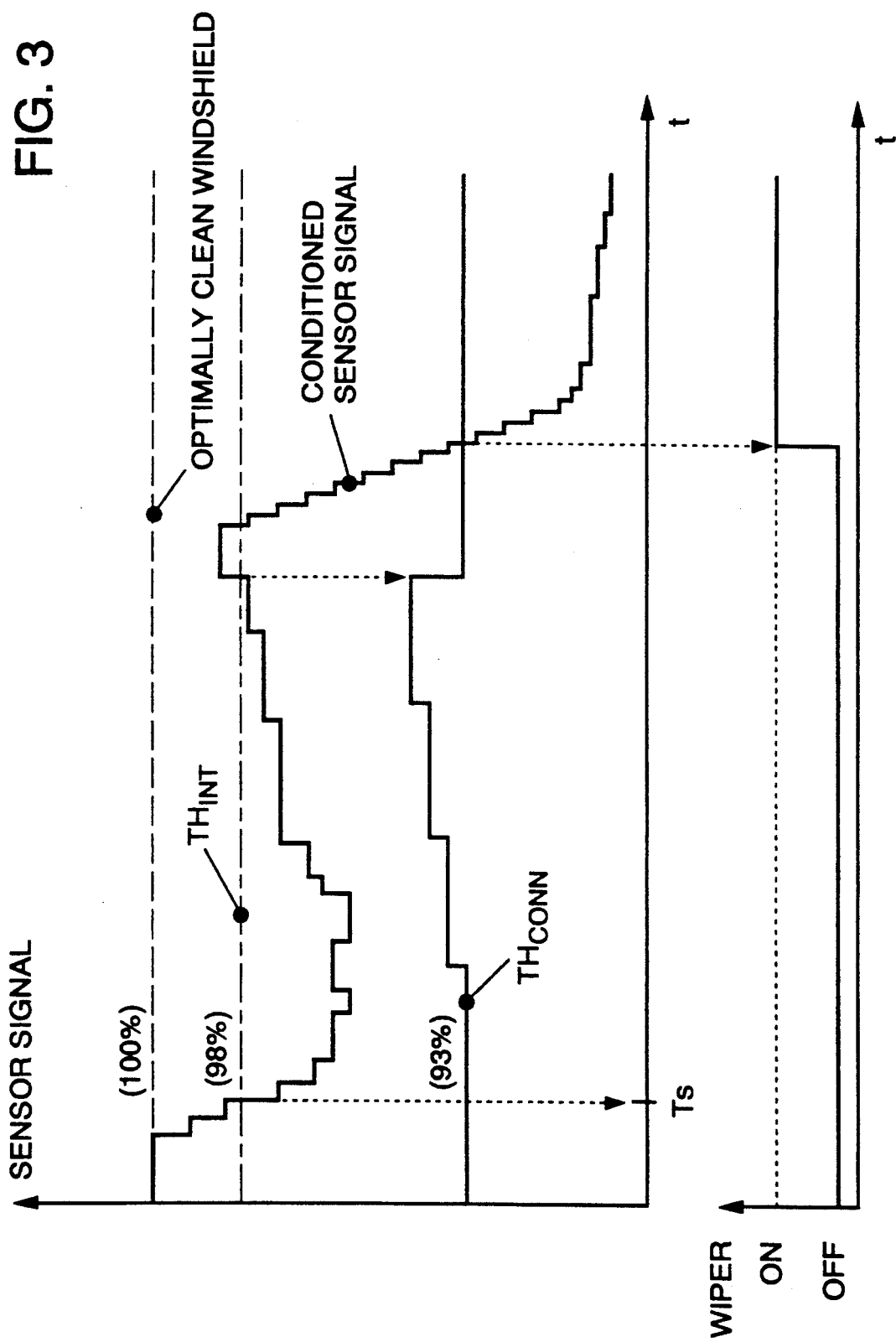

APPARATUS AND METHOD FOR CONTROLLING A WINDSHIELD WIPING SYSTEM

Cross-Reference To Related Application

This application is a continuation-in-part of U.S. patent application Ser. No. 07/989,052, filed Dec. 10, 1992 titled "Apparatus And Method For Controlling A Windshield Wiping System" filed herewith, the specification of which is hereby expressly incorporated by reference in its entirety.

TECHNICAL FIELD

The present invention relates to windshield wiping systems and, more particularly, to an apparatus and method for controlling a windshield wiping system based on the quality and quantity of a liquid or solid coating present on the windshield.

BACKGROUND ART

A device for controlling a wiper motor was disclosed in German patent DE 33 14 770 C2 and includes an optoelectronic sensor apparatus and a circuit arrangement connected to a drive motor, so that control of the drive motor may be effected in dependence upon the coating present on the windshield.

The device does not, however, include any means for allowing detection of the last sweep process of a wiping cycle which effects a last cleaning of the measuring range of the sensor apparatus. This device may to some extent satisfactorily adapt the wiping cycle frequency automatically to quantitative changes arising during wiper operation in the condition of the coating on the windshield, such as, for example, the degree of dirt accumulation, or the quantity of rain or snow striking the windshield. However, it is not possible satisfactorily to achieve precise automatic adaptation of the wiping cycle frequency to both qualitative and quantitative changes in the condition of the coating on the windshield. Furthermore, with such devices for controlling a windshield wiping system, there arises under certain circumstances an erratic connection and disconnection, or an erratic switching back and forth, between the intermittent and continuous wiping mode of the drive motor. This is, at the very least, distracting to the vehicle operator and difficult to get used to, and may moreover also become a source of unpleasant irritation.

SUMMARY OF THE INVENTION

It is therefore an object of the present invention to provide an improved apparatus and method for controlling a windshield wiping system.

It is a further object of the present invention to provide an apparatus and method for controlling a windshield wiping system to operate in a particularly harmonic type of wiping cycle, with smooth connection and disconnection activities as well as switchover activities between intermittent and continuous wiping modes.

In carrying out the above object and other objects and features of the present invention, an apparatus is provided for controlling a vehicular windshield wiping system including a motor and at least one windshield wiper. The apparatus includes a sensor mounted to the windshield for monitoring a portion of the windshield wiped by the wiper during each wipe cycle. The sensor generates a signal having a value which varies as a coating collects on the monitored portion. The apparatus further comprises means for defining a connection threshold, based on the sensor signal, for starting operation of the windshield wiping system and means for defining a first disconnection threshold, based on the sensor signal, for ceasing operation of the windshield wiping system in a first mode of operation. The apparatus also comprises means for defining a second disconnection threshold, based on the sensor signal, for ceasing operation of the windshield wiping system in a second mode of operation.

The advantages accruing to the present invention are numerous. For example, the particularly harmonic nature of the wiper operation of the windshield wiping system meets very high standards with regard to the comfort of the vehicle operator.

The above objects and other objects, features, and advantages of the present invention will be readily appreciated from the following detailed description of the best mode for carrying out the invention when taken in connection with the accompanying drawings.

BRIEF DESCRIPTION OF THE DRAWINGS

FIG. 2 is a graphical representation of the various connection and disconnection thresholds for use with the present invention; and FIG. 3 is a graphical illustration of the incrementing of the connection threshold for use with the present invention.

BEST MODE FOR CARRYING OUT THE INVENTION

Figure 1:
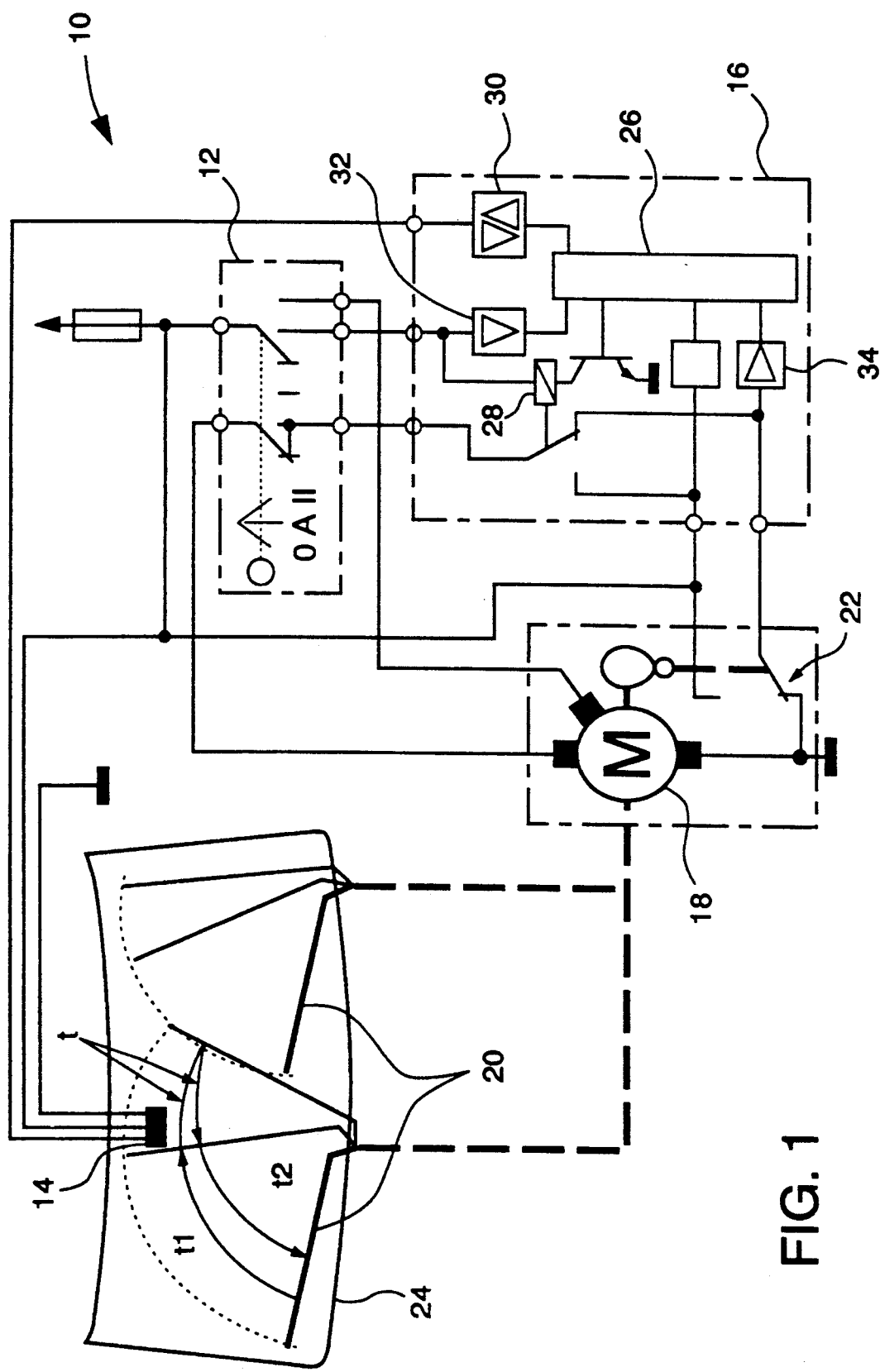
FIG. 1 is a block diagram of the apparatus for controlling a windshield wiping system of the present invention.

Referring now to FIG. 1 there is illustrated an apparatus, shown generally by reference numeral 10, for controlling a windshield wiping system including windshield wipers 20 and a motor 18. As shown, the apparatus includes a switch arrangement 12, an optoelectronic sensor 14 mounted to the inside surface of a windshield 24 and a circuit arrangement 16. The optoelectronic sensor 14 and the circuit arrangement 16 are activated via the switch arrangement 12. The motor 18 is activated by the microprocessor 26 via a wiper relay 28 based on signals from the optoelectronic sensor 14 and the switch arrangement 12. The optoelectronic sensor includes infrared beam transmitters for emitting beams and infrared beam receivers for receiving the emitted beams, which are modified based on the coating present on the windshield. The optoelectronic sensor 14 generates a signal, the value of which varies based on the presence of a coating, such as liquid, or dirt, on the area of the windshield monitored by the optoelectronic sensor 14.

With continuing reference to FIG. 1, the sensor signal is provided to a microprocessor 26 which processes the signal and accordingly controls the windshield wiping system. It should be appreciated that although the windshield wiping system is shown to be controlled by a microprocessor, the system could also be controlled by an analog and/or digital switching system, or the like. Communication between the optoelectronic sensor 14 and the microprocessor 26 is facilitated by serial interface/signal processing circuitry shown generally by reference numeral 30. Associated with the motor 18 is a switching contact device 22 enabling detection of the parked, or resting, position of the wipers 20, and the start and end signals of the operating time of the windshield wipers 20 for determining the operating time of the windshield wiping system. The microprocessor 26 provides means for determining the last sweep of the wiper across the monitored portion, based on the operating time of the wiping system. As shown, signals from the switch arrangement 12 and the switch contact device 22 are processed by signal conditioning circuitry shown generally by reference numeral 32 and 34, respectively, prior to being received by the microprocessor 26.

With continuing reference to FIG. 1, to activate the windshield wiping system, the switch arrangement 12 is moved out of the OFF switch position (shown as "O") and into the automatic switch position (shown as "A"). In the automatic switch position, the intermittent and continuous wiping functions are combined in speed stage I. The switch arrangement 12 may also be moved into the continuous wiping switch position II, in which the windshield wiping system is operated in speed stage II.

Each time the switch arrangement 12 is moved into the automatic switch position A, a wiping cycle t is initiated and an initial reference value is formed based on the sensor signal. If there is a coating (e.g. rain) on the outer surface of the windshield 24 when the automatic switch position A is selected, the wiping system is activated to clean the windshield and one of the windshield wipers 20 passes over the measuring range of the sensor 14 (i.e. the monitored portion of the windshield) twice during a wiping cycle t. If the circuit arrangement 16 detects a further coating that strongly impairs visibility (e.g. heavy rain) on the monitored portion of the windshield 24, based on the signals from the optoelectronic sensor 14 after the second sweep during a wiping cycle t, a new wiping cycle t is immediately started after the windshield wipers 20 have reached the parked position (at the end of wiping cycle t). However, if the circuit arrangement 16 detects a further coating that only slightly impairs visibility (e.g. light rain) on the windshield 24 after the second sweep during a wiping cycle t, after the windshield wipers 20 have reached the parked position, the wipers are held by the switching contact device 22 in the parked position for a predetermined length of time.

The length of the time delay is updated after each wiping cycle, based on the coating newly forming on the windshield 24 (e.g. rain intensity). In one embodiment, the second sweep of the windshield wipers 20 over the sensor 14 is determined by the microprocessor based on the representative characteristic of the sensor signals (e.g. the sensor signal experiences a sharp, or steep, increase in value just after a wiper passes over the sensor). Alternatively, the second sweep is determined by the microprocessor 26 based on an operating-time acquisition procedure, which breaks down an entire wiping cycle t into individual operating times t1 and t2. The operating time t1 corresponds to the period of time from the start signal of a wiping cycle t up to attainment of the monitored portion of the windshield. The operating time t2 corresponds to the period of time just after the wipers pass the monitored portion for the last time during a wiping cycle up to attainment of the parked position by the wipers 20. The operating time t2 and possibly the time delay tp are utilized by the microprocessor 26 to decide when a new wiping cycle is to be initiated.

The maximum signal value of the optoelectronic sensor 14, which normally sets in shortly after the wipers have passed over the sensor for the last time during a wiping cycle within the operating time t2, is preferably read into the microprocessor as a new reference value for the next wiping cycle t. In dependence upon said reference value, a connection threshold ($TH_{CONN}$) for starting a wipe cycle, a disconnection threshold for the intermittent wiping mode ($TH_{DIM}$) for switching over from intermittent mode to continuous, and a disconnection threshold for the continuous wiping mode ($TH_{DCM}$), for stopping continuous mode operation are automatically determined by the microprocessor 26. However, if during the entire measuring period a higher maximum signal value should arise, e.g. as a result of evaporation of smears, that signal value is read as a new reference value into the microprocessor 26.

With reference now to FIG. 2, assuming the clean state of the windshield 24 as a criterion of quality for the sensor signals, in terms of value, the disconnection threshold for the intermittent wiping mode lies above the connection threshold, and the disconnection threshold for the continuous wiping mode lies above the disconnection threshold for the intermittent wiping mode. Stated algebraically, $TH_{DIM} > TH_{CONN}$, and $TH_{DCM} > TH_{DIM}$.

If the clean state of the windshield 24 deteriorates while the switch arrangement 12 is in the automatic switch position, the sensor signal first falls below the disconnection threshold for the continuous wiping mode and then falls below the disconnection threshold for the intermittent wiping mode. Only at a drop below the connection threshold, however, is the motor 18 activated by the microprocessor and set in operation, such that the windshield wipers 20 clean the windshield 24. Preferably, the optoelectronic sensor 14 determines to what extent the clean state of the windshield 24 achieved by the wiping process of the wipers has again deteriorated as a result of, for example, rain. If, after the wipers have passed over the sensor 14 for the last time during a wipe cycle, the sensor signal again drops below the connection threshold within a predetermined maximum period of time, this automatically gives rise, after a corresponding time delay tp, to an additional wiping cycle. If, after a wiping process, there is no further drop below the connection threshold within the predetermined maximum period of time, there is also no further wiping process dependent on the state of the windshield 24. While the switch arrangement 12 remains in the automatic switch position A, the state of the windshield 24 is preferably still continuously monitored by the sensor 14 and a further wiping process will only be initiated if the sensor signal again falls below the connection threshold. However, in order to make it clear to the vehicle user that the switch arrangement 12 is in its automatic switch position A, after a specific period of time, e.g. two minutes, a check wiping process may be initiated independently of the state of the windshield 24 or the sensor signal.

With continuing reference to FIG. 2, if the windshield wiping system is operating in intermittent wiping mode, the circuit arrangement 16 monitors the sensor signal. At the end of operating time t2, (i.e. the period of time just after the wipers pass the monitored portion for the last time during a wiping cycle up to attainment of the parked position by the wipers 20) the parked position of the windshield wipers is detected by the microprocessor 26 based on a signal from the switch contact device 22. At that moment, the sensor signal value is compared to the disconnection threshold for the intermittent wiping mode. At a drop below the disconnection threshold, a new wiping cycle is preferably initiated without time delay tp. In the absence, however, of a drop below the disconnection threshold at the end of operating time t2, the sensor signal is compared to the connection threshold. A time delay is initiated and a new wiping cycle is only triggered if the sensor signal falls once more below the connection threshold.

In the event of, for example, a considerable precipitation, then depending on its intensity it may happen that the windshield wiping system is operating in the continuous wiping mode, wherein there are consecutive wipes of the wipers occur without a time delay therebetween. At the end of operating time t2, to control the windshield wiping system, the sensor signal is compared to the disconnection threshold for the continuous mode. If, as a result of the precipitation easing off slightly, there is no drop below the disconnection threshold for the continuous mode ($TH_{DCM}$), the microprocessor maintains energization of the motor 18 in the continuous wiping mode for a specific number of wiping cycles, e.g. one further wiping cycle. Only if, after the further wiping cycle, there is no further drop below $TH_{DCM}$, is the windshield wiping system switched off. Only if the sensor signal drops once more below the connection threshold, is there possibly a change in the operating mode, i.e. the windshield wiping system is operated according to the sensor signal, e.g. in intermittent wiping mode. For purposes of this discussion, continuous wiping mode is mode of operation wherein there are at least three consecutive wiping cycles without a time delay therebetween. After three such wiping cycles, upon the parked position being reached, the circuit arrangement 16 therefore no longer scans the disconnection threshold for the intermittent wiping mode but the disconnection threshold for the continuous wiping mode.

If the windshield wiping system is in the continuous wiping mode, not only the operating time t2 but also the operating time t1 is used to evaluate the sensor signal. This doubles the probability that in the evaluation period a rain drop, for instance, will fall on the monitored portion of the windshield and be detected by the sensor 14.

Naturally, changes in the operating modes which differ from the sequence are also possible under comparable conditions. However, the placing of the disconnection threshold for the intermittent wiping mode and the disconnection threshold for the continuous wiping mode at values which differ from each other leads to smooth operation of the windshield wiping system, which is extremely comfortable for the vehicle operator, owing to the continuous transitions between the continuous and intermittent wiping modes.

With reference now to FIG. 3, to exclude malfunctions and further increase comfort, the apparatus of the present invention includes means for defining an interference threshold level ($TH_{INT}$) preferably situated above the connection threshold level. Preferably, the interference level represents the maximum sensitivity of the optoelectronic sensor 14. The interference threshold level is a level at which it can be assumed with a high degree of certainty that there is a coating on the windshield 24, i.e. it is in all probability not a case of undefined disturbances. Changes in the sensor signal regarding the cleanliness of the windshield surface above the interference threshold level are evaluated as a disturbing influence of no importance and do not result in a reaction of any kind. An added advantage is that the interference threshold level is a means of compensating for long-time effects (e.g. aging, changes in temperature, and the like) which might lead to incorrect evaluation of the sensor signal regarding the cleanliness of the windshield. If small changes in the cleanliness of the windshield 24, which lie above the interference threshold level, are observed over an extended period, e.g. one minute, no wiping process is triggered, but the actually measured value is used as a new reference value for the state of an optimally clean windshield 24. However, if the windshield 24 is, for example, only slightly wet, i.e. the cleanliness of the windshield 24 is impaired only to the extent that there is a drop below the interference threshold level but not below the connection threshold, the connection threshold is incremented over an extended period. The value of the connection threshold is therefore varied in dependence upon the period of time during which the sensor signal remains below the interference threshold level. As a result of this variation, the connection threshold is adjusted progressively more sensitively so that, after a specific period of time, e.g. one minute, the sensor signal drops below the incremented connection threshold, resulting in triggering of a wiping cycle. A wiping cycle is therefore triggered, for example, if the windshield 24 after a wiping cycle is still slightly wet from rain but the rain suddenly stops. If however, after a specific period of time, the sensor signal again exceeds the interference threshold level, the incremented connection threshold is reset to its original value without a wiping cycle being triggered. Thus, in terms of the control of a windshield wiping system, extremely high standards of comfort on the part of the vehicle user are met.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention.

What is claimed is:

1. An apparatus for controlling a vehicular windshield wiping system including at least one windshield wiper, the apparatus including a sensor mounted to the windshield f or monitoring a portion of the windshield wiped by the wiper during each wipe cycle, the sensor generating a sensor signal having a value which varies as a coating collects on the monitored portion, the apparatus further comprising:

means for defining a connection threshold based on the sensor signal, the sensor signal being compared to the connection threshold for starting operation of the windshield wiping system;

means for defining a first disconnection threshold based on the sensor signal, the sensor signal being compared to the first disconnection threshold for ceasing operation of the windshield wiping system in a first mode of operation; and means for defining a second disconnection threshold based on the sensor signal, the sensor signal being compared to the second disconnection threshold for ceasing operation of the windshield wiping system in a second mode of operation.

2. The apparatus of claim 1 wherein the first mode of operation is an intermittent mode of operation, wherein successive wipes of the wipers across the windshield are separated by a predetermined time delay, and the second mode of operation is a continuous mode of operation, wherein successive wipes of the wipers are not separated by a time delay.

3. The apparatus of claim 2 wherein the disconnection threshold for the intermittent wiping mode has a value which exceeds the value of the connection threshold.

4. The apparatus of claim 2 wherein the disconnection threshold for the continuous wiping mode has a value which exceeds the value of the disconnection threshold for the intermittent wiping mode.

5. The apparatus of claim 2 further comprising means for maintaining operation of the windshield wiping system after operation in the continuous mode even if the sensor value exceeds the disconnection threshold for the continuous mode of operation, such that the wiping system operates for at least one additional wiping cycle.

6. The apparatus of claim 1 further comprising means for defining an interference threshold based on the sensor signal, the interference threshold having a predetermined value for indicating the presence of a coating on the windshield with substantial certainty.

7. The apparatus of claim 6 wherein the connection threshold is a variable quantity, the means for defining the connection threshold including means for incrementing the connection threshold from an original value in predetermined intervals when the sensor signal has a value which falls below the interference threshold but not below the connection threshold.

8. The apparatus of claim 7 wherein the means for incrementing the connection threshold increments the connection threshold at a rate which varies based on the period of time during which the sensor signal remains below the interference threshold but above the connection threshold.

9. The apparatus of claim 8 wherein the means for defining the connection threshold includes means for decrementing the connection threshold to the original value when the sensor signal, within a specific period of time after falling below the interference threshold, again exceeds the interference threshold.

10. The apparatus of claim 1 wherein the connection threshold has a value of about 93% of the sensor signal value associated with an optimally clean windshield.

11. The apparatus of claim 1 wherein the disconnection threshold for the first mode of operation has a value of about 95% of the sensor signal value associated with an optimally clean windshield.

12. The apparatus of claim 1 wherein the disconnection threshold for the second mode of operation has a value of about 97% of the sensor signal value associated with an optimally clean windshield.

13. The apparatus of claim 6 wherein the interference threshold has value of about 98% of the sensor signal value associated with an optimally clean windshield.

14. A method for controlling a vehicular windshield wiping system including a motor and at least one windshield wiper, the method comprising:
  monitoring a portion of the windshield wiped by the wiper during a wipe cycle;
  generating a signal having a value which varies as a coating collects on the monitored portion of the windshield;
  defining a starting threshold having a value based on the signal for starting operation of the windshield wiping system;
  defining at least one other threshold having a value based on the signal for ceasing operation of the windshield wiping system, the at least one other threshold having a value higher relative to the value of the starting threshold;
  activating the motor when the signal value crosses the starting threshold, such that the wiper leaves a resting position and wipes the windshield, passing over the monitored portion of the windshield at least once during the wipe cycle:
  determining when the wiper passes over the monitored portion of the windshield for the last time during the wipe cycle; and
  deactivating the motor when the signal value generated after the wiper passes over the monitored portion of the windshield for the last time during the wipe cycle crosses the at least one other threshold.

15. The method of claim 14 wherein the step of defining at least one other threshold includes defining a first disconnection threshold having a value based on the signal for ceasing operation of the windshield wiping system in a first mode of operation, and defining a second disconnection threshold having a value based on the signal for ceasing operation of the windshield wiping system in a second mode of operation.

16. The method of claim 15 wherein the first mode of operation is an intermittent mode of operation, wherein successive wipes of the wipers across the windshield are separated by a predetermined time delay, and the second mode of operation is a continuous mode of operation, wherein successive wipes of the wipers are not separated by a time delay.

17. The method of claim 16 wherein the disconnection threshold for the intermittent wiping mode has a value which exceeds the value of the starting threshold.

18. The method of claim 17 wherein the disconnection threshold for the continuous wiping mode has a value which exceeds the value of the disconnection threshold for the intermittent wiping mode.

* * * * *